United States Patent
Stegall et al.

(10) Patent No.: US 8,725,106 B1
(45) Date of Patent: *May 13, 2014

(54) REDUCING COMMUNICATION SILENCE WHEN PERFORMING INTER-TECHNOLOGY HANDOFF

(75) Inventors: Mark A. Stegall, Melissa, TX (US); Marvin Bienn, Dallas, TX (US); Jing Chen, Plano, TX (US); Gary B. Stephens, Richardson, TX (US)

(73) Assignee: Apple Inc., Cupertino, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 13/449,600

(22) Filed: Apr. 18, 2012

Related U.S. Application Data

(63) Continuation of application No. 12/119,024, filed on May 12, 2008, now Pat. No. 8,169,968.

(60) Provisional application No. 60/917,108, filed on May 10, 2007.

(51) Int. Cl.
*H04M 11/00* (2006.01)

(52) U.S. Cl.
USPC .......................................................... 455/403

(58) Field of Classification Search
USPC ......... 370/331, 310, 328, 339, 464, 465, 466, 370/467; 455/403, 422.1, 436, 442
See application file for complete search history.

(56) References Cited

U.S. PATENT DOCUMENTS

| | | | |
|---|---|---|---|
| 7,590,092 B2 * | 9/2009 | Milton et al. | 370/331 |
| 7,643,830 B2 * | 1/2010 | Catovic et al. | 455/436 |
| 7,697,480 B2 * | 4/2010 | Marin et al. | 370/331 |
| 8,169,968 B1 * | 5/2012 | Stegall et al. | 370/331 |
| 2006/0111115 A1 * | 5/2006 | Marin et al. | 455/442 |
| 2007/0058791 A1 * | 3/2007 | Liu et al. | 379/88.17 |
| 2007/0254625 A1 * | 11/2007 | Edge | 455/404.1 |
| 2008/0014941 A1 * | 1/2008 | Catovic et al. | 455/436 |
| 2008/0175176 A1 * | 7/2008 | George et al. | 370/310 |
| 2008/0205386 A1 * | 8/2008 | Purnadi et al. | 370/389 |
| 2010/0124897 A1 * | 5/2010 | Edge | 455/404.1 |

* cited by examiner

*Primary Examiner* — Fan Ng
(74) *Attorney, Agent, or Firm* — Meyertons, Hood, Kivlin, Kowert & Goetzel, P.C.

(57) ABSTRACT

To perform an inter-technology handoff, an indicator in a service request message is received by a mobile switching center (MSC). The indicator is to indicate to the MSC that an inter-technology handoff from a packet-data wireless access network to a circuit wireless access network has been requested. The behavior of the MSC is modified in response to the indicator to reduce the communication silence during the inter-technology handoff.

18 Claims, 6 Drawing Sheets

REDUCING COMMUNICATION SILENCE WHEN PERFORMING INTER-TECHNOLOGY HANDOFF

CROSS-REFERENCE TO RELATED APPLICATIONS

This application is a continuation application of U.S. patent application Ser. No. 12/119,024, filed May 12, 2008, entitled "Reducing Communication Silence When Performing Inter-Technology Handoff", which claims the benefit under 35 U.S.C. §119(e) of U.S. Provisional Application Ser. No. 60/917,108, filed May 10, 2007, entitled "Voice Gap Reduction for Inter-Technology Hard Handoff (ITHHO) and Voice Call Continuity (VCC) Coordinated Voice Break," the entirely of both of which are hereby incorporated by reference.

TECHNICAL FIELD

The invention relates generally to reducing communication silence during handoff of a mobile device between two different types of wireless access networks.

BACKGROUND

Mobile or wireless communications networks are capable of carrying circuit-switched and packet-data traffic (e.g., voice traffic, data traffic, etc.) between a mobile device and some other endpoint or endpoints. The endpoint can be another mobile device or a device connected to a network such as a public switched telephone network (PSTN) or a packet data network. Traditional wireless protocols provide for circuit-switched communications between devices, such as the circuit-switched protocol provided by 1xRTT, as defined by CDMA (code division multiple access) 2000. With circuit-switched communications, a dedicated circuit or channel is established between nodes and terminals to allow communication between endpoints. Each circuit or channel that is dedicated cannot be used by other users until the circuit or channel is released.

In contrast, with packet-data communications, data is split into packets, with the packets routed individually over one or more paths. A widely-used protocol for transporting packet-data communication information is Internet Protocol (IP). Examples of packet-data communications that are possible over packet-data networks include electronic mail, web browsing, file downloads, electronic commerce transactions, voice or other forms of real-time, interactive communications, and others.

To provide wireless access to a packet-data network, a wireless access network according to any of the following standards can be used: EV-DO or EV-DV (also referred to as HRPD or high rate packet data), as defined by the CDMA 2000 family of standards; WiFi; WiMax (Worldwide Interoperability for Microwave Access); and others.

It is common for circuit wireless access networks (such as those based on 1xRTT) to coexist with packet-data access networks within a communications network. Certain mobile devices are able to operate with both circuit wireless access networks and packet-data wireless access networks. Such mobile devices are referred to as multi-mode mobile devices.

Conventionally, when a multi-mode mobile device transitions from a packet-data wireless access network, such as an EvDO access network, to a circuit wireless access network, such as a 1xRTT access network, a relatively large voice gap can occur during the handoff. A "voice gap due to handoff" refers to a time duration during which voice bearer data is not being exchanged between the mobile device and some other endpoint as a result of the mobile device transitioning from one access network to a different access network. A long voice gap can be bothersome to the users involved in the call session, and sometimes may even result in the call being dropped by one of the users.

SUMMARY OF THE INVENTION

According to a preferred embodiment, a method of reducing communication silence when a mobile device hands off between different types of wireless access networks includes communicating a special indicator in a handoff request sent to a mobile switching center (MSC). The special indicator is used to indicate to the MSC/VLR (Visitor Location Register) that an inter-technology handoff from a packet-data wireless access network to a circuit wireless access network has been requested, such that the MSC/VLR can take action to reduce communication silence (e.g., voice gap) during the handover of the mobile device.

Other or alternative features will become apparent from the following description, from the drawings, and from the claims.

DETAILED DESCRIPTION OF PREFERRED EMBODIMENTS OF THE INVENTION

Figure 1:
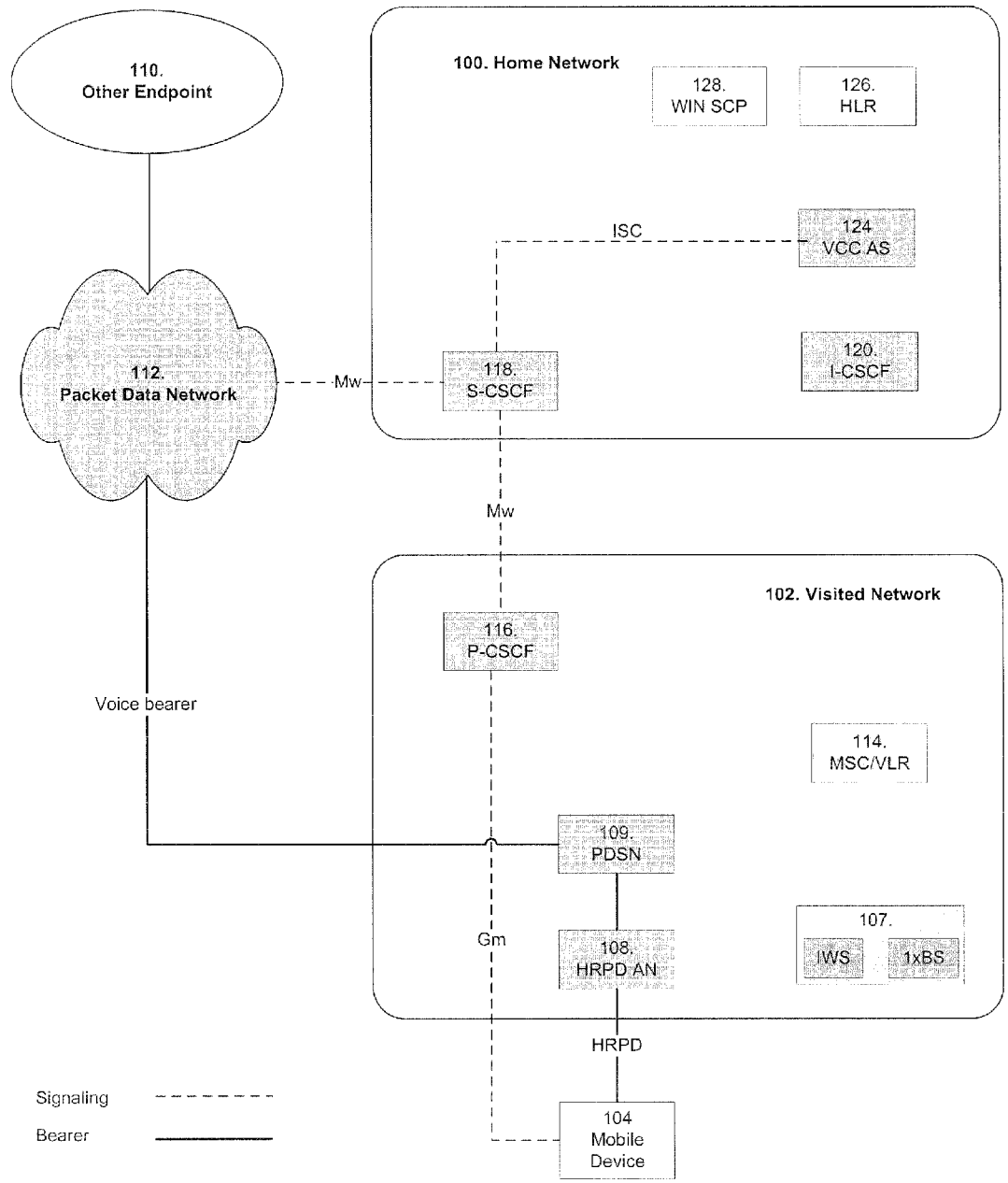
FIGS. 1-3 are block diagrams to illustrate an inter-technology handoff according to preferred embodiments of the invention of a mobile device from a packet-data domain to a circuit-switched domain.

In the following description, numerous details are set forth to provide an understanding of some embodiments. However, it will be understood by those skilled in the art that some embodiments may be practiced without these details and that numerous variations or modifications from the described embodiments may be possible.

According to preferred embodiments, a technique or mechanism is provided to reduce a voice gap (or other communication silence) during a communications session as a mobile device is being handed over from a packet-data wireless access network to a circuit wireless access network (an inter-technology handoff). A circuit wireless access network is a wireless network that established a fixed bandwidth channel or connectivity from the access device to the first network call control node. The channel is dedicated to the access device. A packet-data wireless access network is a wireless network that provides data connectivity between a packet-data network (typically a public or private internet) and an access terminal. The connectivity between the access terminal and the packet-data network is over a shared channel (or connection). Examples of a packet-data wireless access network include High-Speed Downlink Packet Access (HSDPA) and Evolution-Data Optimized (EV-DO). A "voice gap" refers to a time duration during which voice bearer data is not being exchanged between two devices which have established a communications dialog. A "voice gap due to handoff" refers to a time duration during which voice bearer data is not being exchanged between the mobile device and the other endpoint as a result of the mobile device handing off, or transitioning, from one access network to a different access network. A voice gap is one example of communication silence in which bearer data is not exchanged between the mobile device and the other endpoint of the established communications dialog. Other types of communication silence can include a break in video bearer data, or any other type of application bearer data. In the ensuing discussion, reference is made to reduction of voice gaps due to handoff. However, the same or similar techniques can be applied to reduction of other forms of communication silence during handoff.

The reason that a relatively large voice gap occurs in a conventional inter-technology handoff from a packet-data wireless access network (e.g., EvDO wireless access network) to a circuit wireless access network (e.g., 1xRTT wireless access network) is that the MSC/VLR is not aware that an inter-technology handoff is occurring. Without a preferred embodiment, the MSC/VLR is operating under the assumption that the mobile device is attempting a service request for the purpose of originating a voice call. This assumption results in the MSC/VLR commanding the packet-data wireless access network to instruct the mobile device to handoff to the circuit wireless access network relatively early. The MSC is a controller in the circuit-switched domain that sets up and releases an end-to-end call session, controls mobility and handover events during the call session, manages billing, and performs other tasks. The VLR is the location register used by an MSC to retrieve information for handling of calls to or from a visiting subscriber. The MSC/VLR may be capable of using packet-data call control messaging (e.g., SIP) and circuit-switched call control messaging (e.g., ISUP) or only be capable of using circuit-switched call control messaging.

In one example, the MSC/VLR commands the packet-data access network to send a handoff message to the mobile device for the purpose of detaching the mobile device from the packet-data wireless access network and attaching the mobile device to a circuit wireless access network. The handoff message is in the form of a traffic assignment message, e.g., Universal Handoff Direction Message (UHDM), which contains various radio parameters associated with a target circuit access network base station that the mobile device is to access and communicate with after the handoff is complete. Once the mobile device detaches from the packet-data wireless access network, a voice gap starts and continues until the other endpoint of the voice call is informed of the change and a new voice signaling path and voice bearer path is established between the other endpoint and the MSC/VLR. For a MSC/VLR that is only capable of using circuit-switched call control messaging, part of establishing a new voice bearer path implies that a media gateway (MGW) is used to exchange voice bearer data between the MSC/VLR and the packet-data network and that a media gateway control function (MGCF) is used to exchange voice signaling data being the MSC/VLR and the packet-data network. Signaling from the MSC/VLR passes through the MGCF as part of the process of informing the other endpoint that a change has occurred, and signaling passing through the MGCF to the MSC/VLR is used to inform the MSC/VLR that the other endpoint has established a new voice bearer path.

A MGCF performs call control protocol conversion between packet-data call control messaging and circuit-switched call control messaging, such as between Session Initiation Protocol (SIP) messaging and ISUP (ISDN User Part) messaging (which is part of the Signaling System No. 7 (SS7) protocol used to set up telephone calls in a circuit-switched domain). A version of SIP is described in Request for Comments (RFC) 3261, entitled "SIP: Session Initiation Protocol," dated June 2002. The MGCF also controls the MGW, such as by using H.248 control messages. A version of H.248 is described ITU-T H.248.1, entitled "Gateway control protocol: Version 1", dated March 2002. The MGW converts between voice bearer data in packet-data format and voice bearer data in circuit-switched format.

Conventionally, the voice gap during a inter-technology handoff can be relatively large, on the order of 2,000 to 3,000 milliseconds (ms). Such a relatively large voice gap may be irritating to users, and in some cases, may result in a voice call being dropped.

To reduce the voice gap, an MSC/VLR configured according to preferred embodiments is able to delay commanding the packet-data wireless access network to send the handoff message (e.g., UHDM) to the mobile device until after a predetermined event has occurred. In one embodiment, the MSC/VLR delays commanding the packet-data wireless access network to send the handoff message until after the MSC/VLR receives a message indicating that the other endpoint is in the process of being informed that a new voice bearer path and new voices signal path is required. In one embodiment, the message providing such indication is an ISUP (ISDN User Part) address complete message (ACM) received by the MSC/VLR in response to an ISUP initial address message (IAM) sent by the MSC/VLR. In other words, the MSC/VLR delays commanding the packet-data wireless access network to send the handoff message until after the MSC/VLR has received the ISUP ACM (which is an indication that the voice bearer path at the other endpoint is about to break or has broken).

In another embodiment, instead of commanding the packet-data wireless access network to send the handoff message based on receipt of the ISUP ACM message by the MSC/VLR, the MSC/VLR can command the packet-data access network to send the handoff message based on receipt of the ISUP ANM message by the MSC/VLR. In other words, the MSC/VLR delays commanding the packet-data wireless access network to send the handoff message until after the MSC/VLR has received the ISUP ANM (which is an indication that the new voice bearer path from the other endpoint to the MSC/VLR has been established).

In another embodiment, instead of commanding the packet-data wireless access network to send the handoff message based on receipt of the ISUP ACM message by the MSC/VLR, the MSC/VLR can command the packet-data access network to send the handoff message anytime after receipt of a message containing routing information that identifies a node (e.g., voice call continuity application server, discussed further below) in the communications network responsible for re-establishing the call session during a inter-technology handoff. This routing information can be an IP multimedia subsystem routing number (IMRN) in some implementations. The routing information, such as IMRN, is used to establish a voice signaling path between the MSC/VLR and a node in the communications network responsible for re-establishing the call session during a inter-technology handoff. For a MSC/VLR that is only capable of using circuit-switched call control messaging the voice signaling path will be established through a MGCF.

In either case, the behavior of the MSC/VLR has been modified such that the MSC/VLR delays commanding the packet-data wireless access network to send the handoff message to the mobile device, such that the voice gap due to inter-technology handoff is reduced. Effectively, the start of the break in voice bearer data at the mobile device as a consequence of the mobile device handing off is delayed such that it is closer in time to the start of the break in voice bearer data at the other endpoint as a consequence of the other endpoint establishing a new voice bearer path, such the overall voice gap is reduced. In some implementations, the voice gap due to handoff can be reduced to less than 500 ms.

The behavior of the MSC/VLR is modified in response to a special indicator included in a handoff request sent from the mobile device to the MSC/VLR. The special indicator (referred to as a packet data (PD) indicator) is an indication to the MSC/VLR that an inter-technology handoff from a packet-data wireless access network to a circuit wireless access network has been requested by the mobile device. In some embodiments, the handoff request from the mobile device that is received by the MSC/VLR is a service request message (e.g., 1x CM Service Request message), which is triggered by the mobile device sending a handoff request message (e.g., 1x call origination message) to the packet-data access network controller. The access network controller, realizing the true nature of the request (e.g., the mobile device is requesting a handoff from the packet-data wireless access network to a circuit wireless access network, converts the handoff request to a service request and in turn adds the PD indicator into the service request message. The access network controller then forwards the service request message containing the PD indicator to the MSC/VLR.

In response to detecting the PD indicator, the MSC/VLR modifies its behavior when processing the service request message, and delays sending the message which will command the packet-data access network controller to instruct the mobile device to handoff until after the occurrence of a predetermined event (e.g., the MSC/VLR receives the ISUP ACM message, the MSC/VLR receives the ISUP ANM message, MSC/VLR receives a SIP 183 Session Progress message, the MSC/VLR receives a SIP 200 OK message, or any time after the MSC/VLR receiving the IMRN).

FIG. 1 illustrates an exemplary arrangement that includes a home network 100 (for a mobile device 104) that is attached to a visited network 102. Dashed lines represent signaling paths, while solid lines represent bearer paths (for carrying voice bearer data or other types of bearer data). The mobile device 104 is a dual-mode mobile device that is capable of being connected to either a circuit wireless access network 107 (e.g., 1xRTT network) or a packet-data wireless access network 108 (e.g., EV-DO network, WiFi network, WiMax network, etc.) in the visited network 102. EV-DO is also referred to as High Rate Packet Data (HRPD). In FIG. 1, the mobile device 104 is shown attached to the packet-data wireless access network 108.

Through the packet-data wireless access network 108, the mobile device 104 is able to communicate with the other endpoint 110 through a packet data serving node (PDSN) 109 and a packet data network 112 (e.g., the Internet, local area network, wide area network, etc.). The other endpoint 110 can be another mobile device, a desktop computer, a portable computer, and so forth.

As depicted in FIG. 1, the circuit wireless access network 107 includes a 1xRTT base station and an IWS (interworking system) which is connected to an MSC/VLR 114. The IWS is shown as part of 107 yet in some arrangements can be part of 108. The IWS performs message translation between packet-data wireless access messages and circuit wireless access messages (e.g., as described in 3GPP2 A.S0008-C v1.0, dated July 2007). The visited network 102 also includes a P-CSCF (proxy call session control function) 116, which is the first packet-data call control contact point for a terminal, such as the mobile device 104, connected to a packet-data access network. The P-CSCF is shown as part of 102 yet in some arrangements can be part of 100. The P-CSCF further communicates packet-data call control signaling, such as SIP messages, with another CSCF, such as a serving CSCF (S-CSCF) 118, which is in the home network 100. SIP messages are used for establishing, releasing, or otherwise controlling packet-data communications sessions.

The home network 100 also includes an interrogating CSCF (I-CSCF) 120 and a voice call continuity (VCC) application server (AS) 124. The VCC AS 124 supports the continuity of a communications session when a mobile device is being handed off between a packet-data domain and a circuit-switched domain. The VCC AS functionality is described in 3GPP TS 23.206 and 3GPP TS 24.206 for when a mobile device is connected to a 3GPP packet-data wireless access network or in 3GPP2 X.S0042 for when a mobile device is connected to a 3GPP2 packet-data wireless access network (e.g., HRPD). As discussed further below, the VCC AS 124 according to an embodiment is configured to control the synchronization of certain communication messages during the inter-technology handoff of the mobile device 104. In accordance with preferred embodiments, the MSC/VLR 114 is provided with communication messages that allow the MSC/VLR 114 to synchronized the voice gap that occurs as mobile device 104 disconnects from the HRPD AN 108 and connects to the circuit wireless access network 107 to the voice gap that occurs due to the establishment of a new voice bearer path between the other endpoint 110 and the MSC/VLR 114.

FIG. 1 also shows circuit-switched domain entities in the home network 100, including a home location register (HLR) 126 and a WIN SCP (wireless intelligent network service control point) 128. The HLR 126 is the central database used for the circuit-switched domain that contains details of each mobile device subscriber that is authorized to use the circuit-switched service domain. The WIN SCP 128 controls service delivery to subscribers, and allows certain high-level services to be moved away from the MSC/VLR 114 and be controlled at the WIN SCP 128. As discussed further below, in the context of one exemplary embodiment, the WIN SCP 128 is used to supply routing information, such as the IMRN, to the MSC/VLR 114 during handoff of the mobile device 104 from the packet-data wireless access network 108 to the circuit wireless access network 107.

In FIG. 1, the following entities in the home and visited networks 100 and 102 are part of the circuit-switched domain: circuit wireless access network 107, MSC/VLR 114, HLR 126, and WIN SCP 128. The following entities are part of the packet-data domain: packet-data wireless access network 108, PDSN 109, P-CSCF 116, S-CSCF 118, and VCC AS 124.

Figure 2:
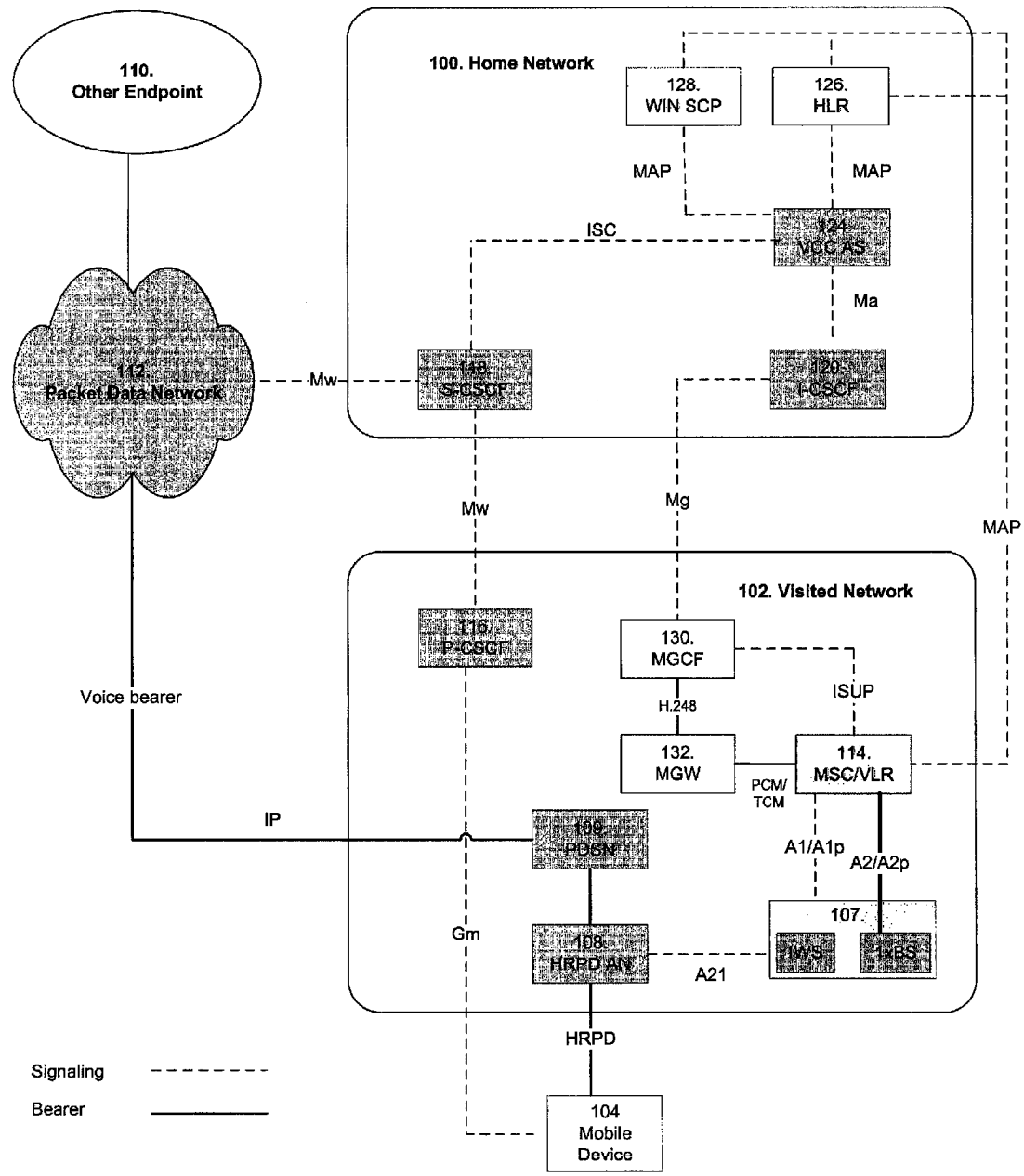

FIG. 2 shows entities that are involved in a handoff of the mobile device 104 from the packet-data domain to the circuit-switched domain. FIG. 2 assumes that the MSC/VLR 114 is only capable of using circuit-switched call control messaging (e.g., ISUP). If a handoff trigger is detected (such as a detection that the strength of the RF signals communicated between the mobile device 104 and the packet-data wireless access network 108 have dropped below a predetermined level and that and the strength of the RF signals communicated between the mobile device 104 and the circuit wireless access network 107 are above a predetermined level), a handoff procedure is initiated (either by the mobile device 104 or the packet-data wireless access network 108). In response to initiation of the handoff procedure, the mobile device 104 sends a handoff request (e.g., in the form of a 1x call origination message) to the packet-data wireless access network 108. The packet-data wireless access network 108 forwards the request to the IWS, which is shown associated with the circuit wireless access network 107. Since in this arrangement the IWS is in part of the circuit wireless access network 107 the 1x call origination message is forwarded over an interface (e.g., A21 interface shown in FIG. 2). The A21 interface is defined in 3GPP2 A.S0008 and 3GPP2 A.S0009 and is used to pass air interface signaling messages between the HRPD AN 108 and a standalone IWS or the IWS-1xBS.

In accordance with a preferred embodiment, the IWS, upon receipt of the 1x call origination message from the mobile device 104, translates it into a CM Service Request message with a PD indicator, and then forwards the CM Service Request message to the MSC/VLR 114.

As depicted in FIG. 2, to perform the inter-technology handoff from the packet-data domain to the circuit-switched domain, communication signaling is exchanged through a MGCF 130, which is associated with MGW 132. If the MSC/VLR 114 is capable of using packet-data call control messaging (e.g., SIP) the use of MGCF 130 and MGW 132 would not be necessary. In this case, the Mg interface would be between MSC/VLR 114 and I-CSCF 120 and IP instead of PCM/TCM would be the voice bearer output of the MSC/VLR 114.

Figure 3:
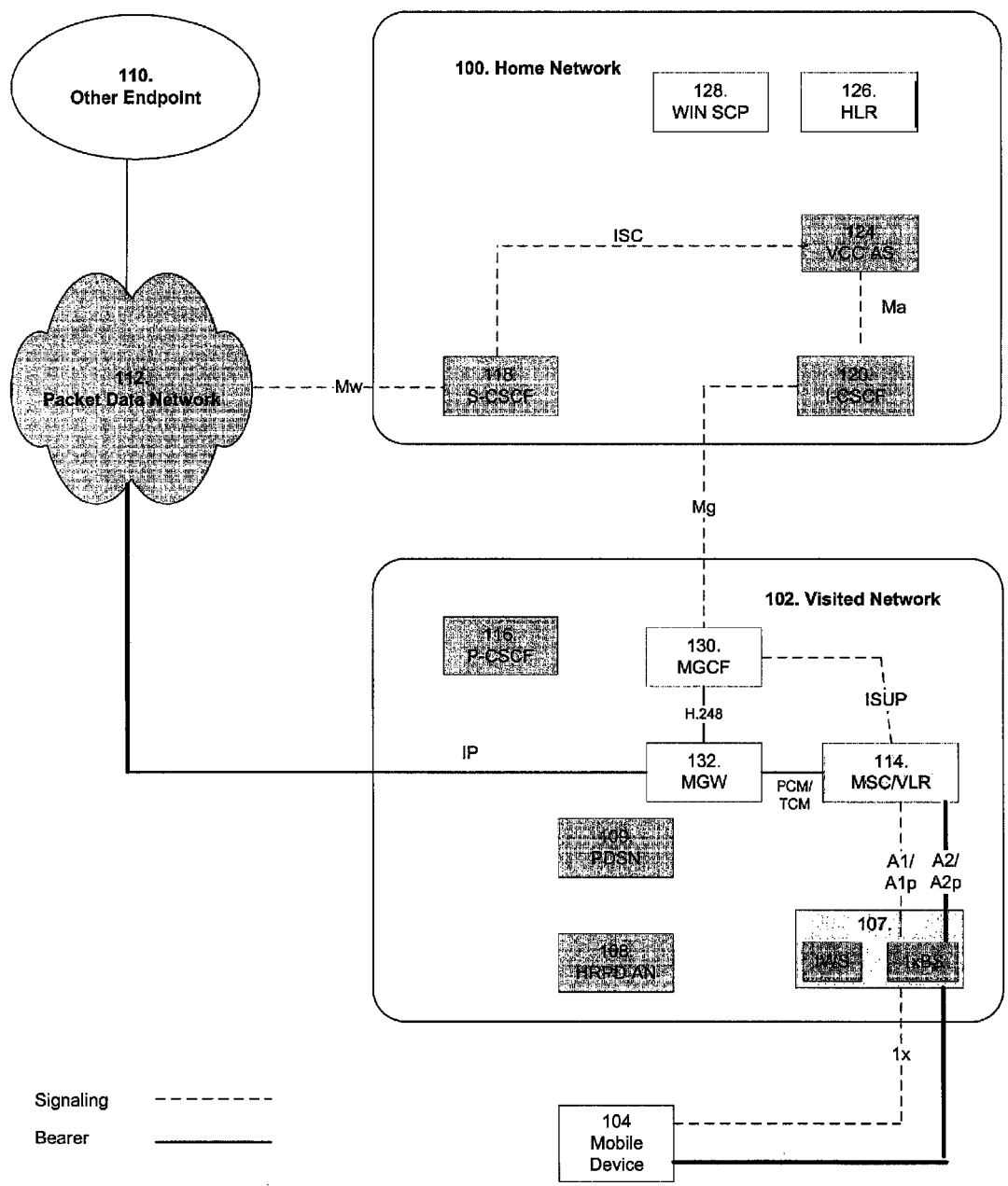

FIG. 3 shows the various signaling and data paths once the inter-technology handoff procedure has completed. As in FIG. 2, FIG. 3 assumes that the MSC/VLR 114 is only capable of using circuit-switched call control messaging (e.g., ISUP). In FIG. 3, the mobile device 104 is attached to the circuit wireless access network 107, rather than the packet-data wireless access network 108 depicted in FIG. 1. Also, for the call in the circuit-switched domain, the new voice bearer data path extends through the circuit wireless access network 107, the MSC/VLR 114, the MGW 132, the packet data network 112 to the other endpoint 110, instead of extending through the packet-data wireless access network 108, the PDSN 109, the packet data network 112, to the other endpoint 110 as shown in FIG. 1. If the MSC/VLR 114 is capable of using packet-data control call messaging (e.g., SIP) the use of MGCF 130 and MGW 132 would not be necessary. In this case, the Mg interface would be between MSC/VLR 114 and I-CSCF 120 and IP instead of PCM/TCM would be the voice bearer output of the MSC/VLR 114 to the packet data network 112.

Figure 4:
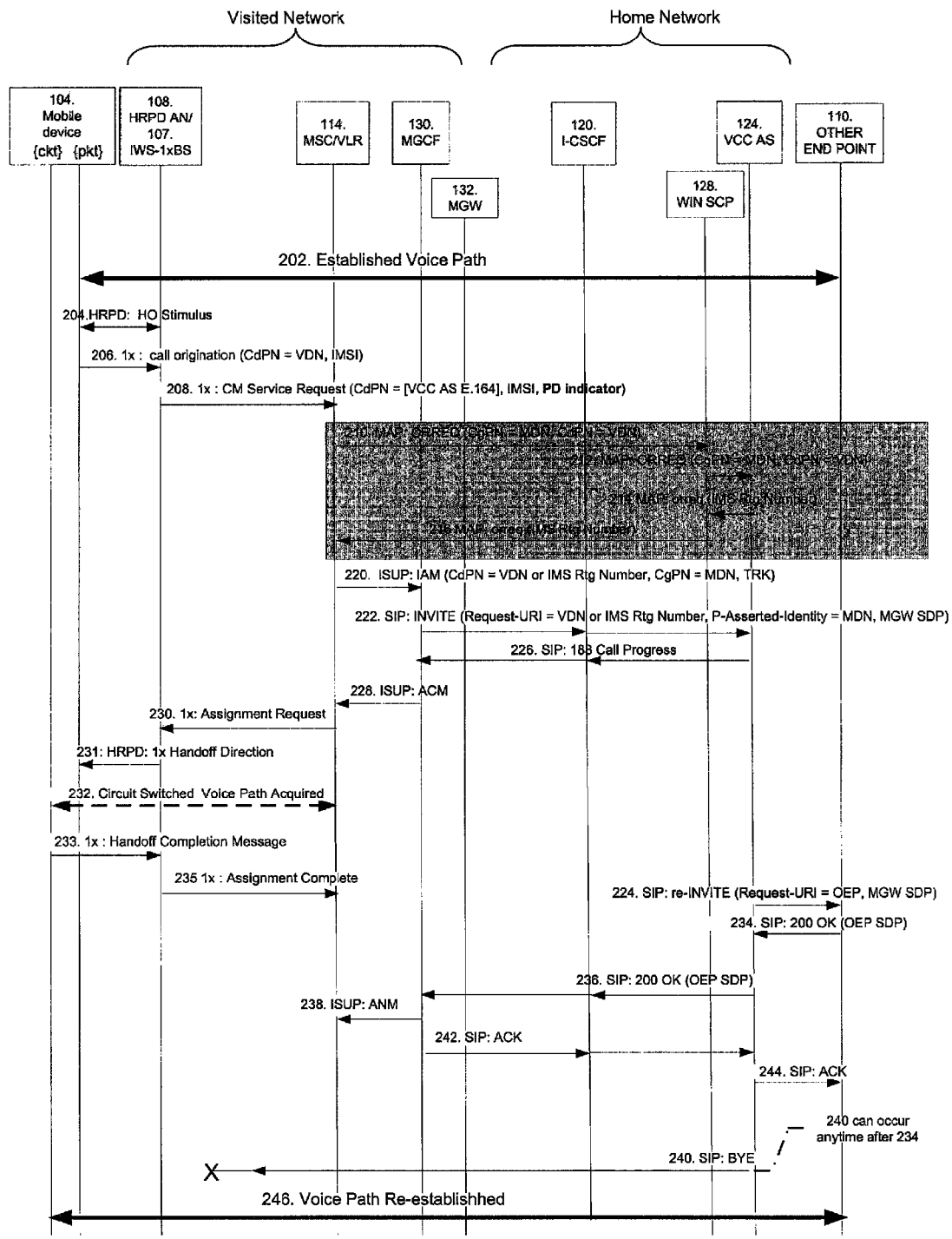
FIGS. 4 and 5 are message flow diagrams of processes of performing inter-technology handoffs of a mobile device from a packet-data domain to a circuit-switched domain, in accordance with preferred embodiments.

FIG. 4 shows an exemplary message flow diagram that depicts a inter-technology handoff procedure from the packet-data wireless access network 108 to the circuit wireless access network 107, according to a preferred embodiment. A voice path 202 through a packet-data domain has been established between the mobile device 104 and the other endpoint 110.

In response to a handoff stimulus (204), the mobile device sends (at 206) a handoff request (e.g., 1x call origination message) to a HRPD AN 108. The call origination message includes a VDN (VCC Domain Transfer Directory Number), which is the directory number associated with the VCC AS 124. The HRPD AN 108 forwards the handoff request to the IWS. The IWS translates the handoff request to a Service Request (e.g., 1x CM Service Request as defined in 3GPP2 A.S0014-C v2.0). The IWS then adds a PD indicator into the 1x CM Service Request. Note that the handoff could continue without the IWS adding the PD indicator to the 1x CM Service Request yet MSC/VLR 114 would assume that the Service Request was a request to originate a call. The IWS then forwards (at 208) the Service Request (with the PD indicator) to the MSC/VLR 114.

The MSC/VLR 114 detects the PD indicator in the 1x CM Service Request, and knows that the Service Request is not a request for a call origination but is for an inter-technology handoff. The PD indicator allows MSC/VLR 114 to modify its behavior such that the message (e.g., 1x Assignment Request) to command the HRPD AN 108 to instruct the mobile device 104 to hand off (e.g., HRPD 1x Handoff Direction message) to the mobile device is not sent after processing 208 but instead is delayed to reduce the voice gap due to inter-technology handoff. In response to the Service Request message, the MSC 114/VLR sends (at 210) an ANSI-41 ORREQ (as defined in 3GPP2 X.S0004-550) message to the WIN SCP 128 (or alternatively, to the HLR 126) to obtain routing information for the inter-technology domain transfer. The ORREQ message contains the Calling Party Number (MDN) of the mobile device 104 and the Called Party Number (VDN of the VCC AS 124) obtained from the 1x CM Service Request message. The WIN SCP 128 (or HLR 126) forwards (at 212) the ORREQ message to the VCC AS 124. Alternatively, the MSC/VLR 114 may send the ORREQ message directly to the VCC AS 124 that has an integrated WIN SCP function.

The VCC AS 124 determines that the ORREQ is a request of an inter-technology domain transfer scenario for mobile device 104 based on the VDN in the Called Party Number (CdPN) and the MDN in the Calling Party Number (CgPN) in the ORREQ message. As a result, the VCC AS 124 allocates an IMRN, which is a temporary routing number associated with this inter-technology domain transfer. The VCC AS 124 then sends back (at 214) a responsive orreq message (containing the IMRN) to the WIN SCP 128 (or HLR 126), which returns (at 216) the orreq message to the MSC/VLR 114. Alternatively, the VCC AS 124 that has an integrated WIN SCP function can send the orreq message directly to the MSC/VLR 114.

After receiving the IMRN, the MSC/VLR 114 creates an ISUP IAM message that includes a CdPN and a CgPN. The CgPN is set to the MDN of the mobile device 104. In this inter-technology handoff context, the CdPN is set to the IMRN from the orreq message received at 216. The translation of CdPN performed by the MSC/VLR 114 results in the ISUP IAM message being routed (at 220) to the MGCF 130.

The MGCF 130 next requests the MGW 132 to create two terminations: (1) the first termination is a TDM (time-division multiplexing) connection between the MGW 132 and the MSC/VLR 114 (the circuit-switched call leg); and (2) the second termination is an RTP/UDP/IP termination between the MGW 132 and the other endpoint 110 (packet-data call leg). RTP stands for Real-Time Protocol and is defined by IETF RFC 3550, and UDP stands for User Datagram Protocol and is defined by IETF RFC 0768.

In response to the IAM received at 220, the MGCF 130 sends (at 222) a SIP INVITE message via the I-CSCF 120 (FIG. 1) to the VCC AS 124, where the SIP INVITE message is used to establish a call session. The SIP INVITE message contains the IMRN as the Request-URI of the INVITE message, where the Request-URI identifies the entity that the INVITE message is being addressed to (in this case the VCC AS 124), a P-Asserted-Identity set to the MDN and a SDP (Session Description Protocol as defined by RFC 4566) offer based on the RTP/UDP/IP termination created by MGW 132.

The VCC AS 124 uses the P-Asserted-Identity in the INVITE message to determine which established voice call requires modification. The VCC AS 124 in response to the INVITE message, sends (at 224) a re-INVITE message to the other endpoint 110 to notify the other endpoint 110 of the change of IP address and UDP Port Number (from the IP address/UDP Port number used by the mobile device 104 to the IP address/UDP Port Number of the MGW 132). The re-INVITE message (at 224) forces the other endpoint 110 to establish a new voice bearer path to MGW 132.

In the preferred embodiment, in response to the INVITE message received at 222, the VCC AS 124 has to send (at 226) a SIP 183 Session Progress to the MGCF 130. The 183 Session Progress message is used to convey information back to the MSC/VLR 114 about the progress of the call.

In response to the 183 Session Progress message, the MGCF 130 sends (at 228) an ISUP ACM message (as defined in 3GPP2 X.S0050) to the MSC/VLR 114. The ACM message indicates to the MSC/VLR 114 that the VCC AS 124 has received the request to re-establish the call session in the circuit-switched domain, and that the VCC AS 124 has forwarded new information to the other endpoint 110 to enable the establishment of a new voice bearer path.

The VCC AS 124 is configured to send 224 and 226 at the earliest opportunity. The VCC AS is also configured to manipulate the sending of 224 and 226 such that 224 reaches the other endpoint 110 as compared to when 228 reached the MSC/VLR 114 is within some defined interval metric (e.g., the time differential that 224 reaches the other endpoint 110 as compared to 228 reaching the MSC/VLR 114 is +/−200 milliseconds).

In one exemplary embodiment, as depicted in FIG. 4, the SIP 183 Session Progress message (226) results in an ACM message (228) that triggers the MSC/VLR 114 to send (at 230) a 1x Assignment Request message to the IWS. The IWS translates and forwards the request to the HRPD AN 108. The HRPD AN 108 converts the request into a handoff initiation message (e.g., a 1x Handoff Direction Message) that is sent (at 231) to the mobile device 104. The handoff initiation message is an instruction to the mobile device 104 to perform the handoff and acquire the circuit traffic channel (e.g., 1xRTT traffic channel). The circuit base station 107 then acquires the reverse traffic channel of the mobile device 104 and a voice bearer path is established (at 232) between the mobile device 104 and the MSC/VLR 114.

The mobile device 104 acknowledges the handoff initiation message (231) by sending (at 233) a handoff done message (e.g., a 1x Handoff Completion Message) to the 1xBS 107. The 1x BS in return sends (at 235) a 1x Assignment Complete message to the MSC/VLR 114. Also, the other endpoint 110 acknowledges the re-INVITE message (sent at 224 from the VCC AS 124) by returning (at 234) a SIP 200 OK message containing the IP address and UDP Port Number (e.g., OEP SDP) of the other endpoint 110 to the VCC AS 124 and by initiating a new voice bearer path to the MGW IP address and UDP Port number received in 224 (e.g., in the MGW SDP). The VCC AS 124 forwards the 200 OK message (at 236) to the MGCF 130 via the I-CSCF 120. The MGCF 130, upon receiving the SIP 200 OK message, requests modification of the MGW 132 termination using the other endpoint 110, SDP (Session Description Protocol) information contained in the SIP 200 OK message, and instructs the MGW 132 to reserve/commit resources for the call. Also, the MGCF 130 sends (at 238) an ISUP ANM (answer message) to the MSC/VLR 114, which is an indication that the other endpoint 110 has modified the call and that the new voice bearer path from the other endpoint 110 to the MSC/VLR 114 has been established.

The MGCF 130 acknowledges the SIP 200 OK message (236) by sending an SIP ACK message (at 242) to the VCC AS 124. In turn, the VCC AS 124 forwards (at 244) the SIP ACK message to the other endpoint 110.

Note that anytime after the VCC AS 124 has received (at 234) the SIP 200 OK message from the other endpoint 110, the VCC AS 124 sends (at 240) a SIP BYE message to the mobile device via the S-CSCF 118 to release SIP call dialog that was initially established between the mobile device 104 and the VCC AS 124. The SIP BYE message is not acknowledged, since when the mobile device 104 is now attached to the circuit wireless access network 107 and thus the mobile device 104 never receives it.

After the procedure depicted in FIG. 4, a voice call is re-established (at 246) between the mobile device 104 and the other endpoint 110 via the circuit-switched domain.

A break in the voice bearer data starts either when the mobile device 104 detaches from the packet-data wireless access network 108 (after 231) or when the other endpoint 110 stops sending voice bearer data to the IP address/UDP Port Number of mobile device 104 and initiates a new voice bearer path to MGW 132 (after receiving 224). The break in the voice bearer data will continue until the other endpoint 110 establishes the new voice bearer path (after MGCF receives step 236) and the mobile device 104 attached to the circuit wireless access network 107.

A "P2C" time interval is defined as the time interval of the MSC/VLR 114 sending a 1x Assignment Request (230) until a 1x Assignment Complete (233) is received by the MSC/VLR 114. The P2C time interval varies for each set of MSC/VLR 114, HRPD AN 108, and circuit wireless access network 107. For some sets the P2C time interval might be short (e.g., 300 milliseconds) whereas for other sets the P2C time interval might be long (e.g., 2000 milliseconds). Usually the P2C time interval for the set is known and in the preferred embodiment the MSC/VLR can use this additional information to determine an appropriate trigger for sending 230.

In the message flow of FIG. 4, as part of the preferred embodiment, the VCC AS 124 provides feedback (226) to the MSC/VLR 114 as to the progress of the establishing the new voice bearer path. A mentioned the VCC AS 124 manipulates the sending of 224 and 226 such that 224 to reach the other endpoint 110 within so time interval (e.g., +/−200 milliseconds) of 228 reaching the MSC/VLR 114. As discussed above, in an alternative embodiment, if the P2C time interval is long, the MSC/VLR 114 might send 230 upon receiving 216 or sending 220. If the P2C time interval is extremely short the MSC/VLR 114 might send 230 after receiving 238.

Figure 5:
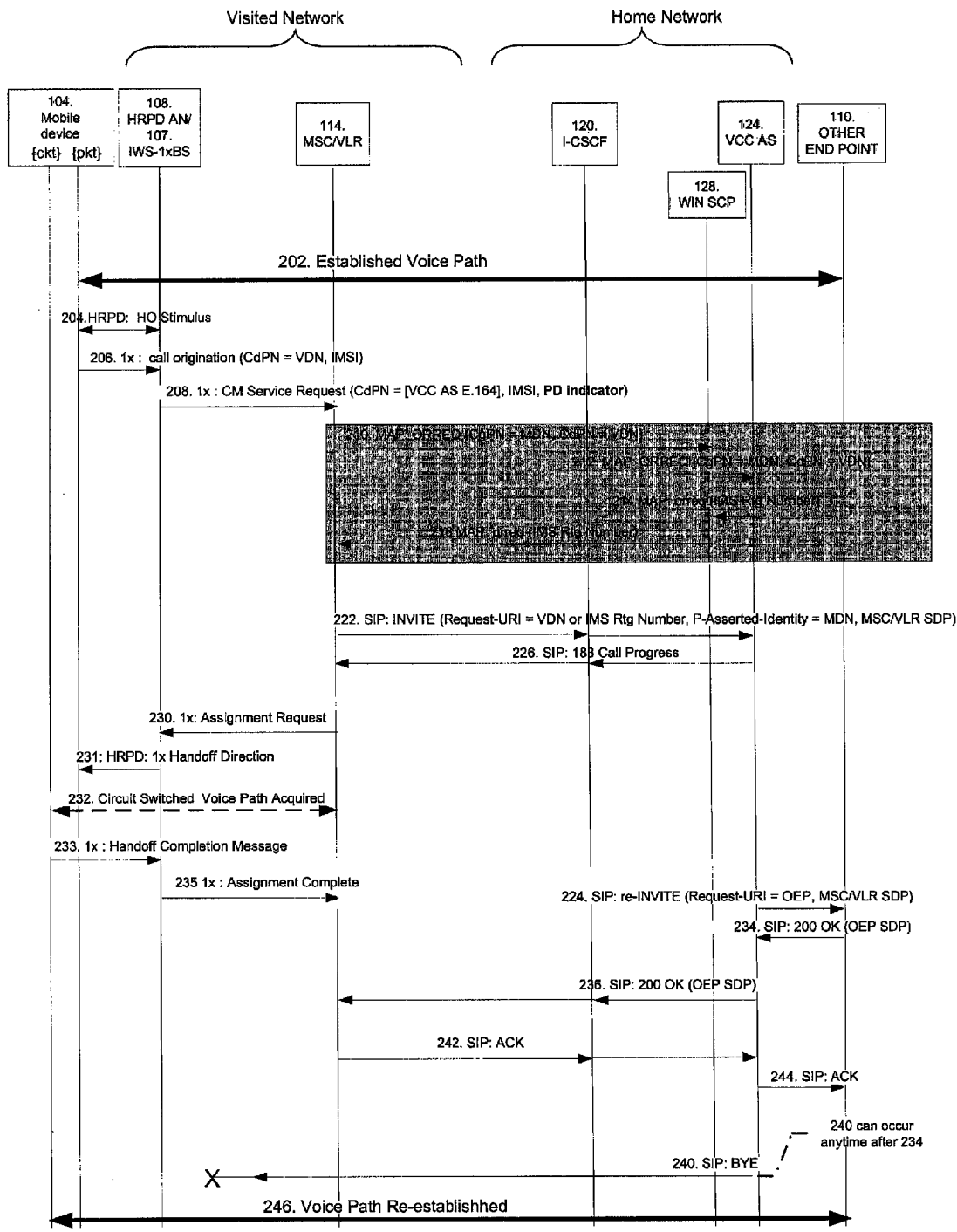

FIG. 5 shows a variation of the FIG. 4 flow in which the MSC/VLR 114 is assumed to be capable of using both packet-data control call messaging (e.g., SIP) and circuit-switched control signaling (e.g., ISUP). In this case, the MGCF 130 and MGW 132 can be omitted, and the messages of FIG. 4 exchanged with the MGCF can be omitted. For example, the SIP 183 Session Progress message is sent (at 226) from the VCC AS 134 to the MSC/VLR 114 instead of the MGCF (note that the ISUP ACM message (228) of FIG. 4 has been omitted in FIG. 5). In this example, the 183 Session Progress message triggers sending (230) of the 1x Assignment Request from the MSC/VLR 114 to the IWS.

Also, the VCC AS 124 can send (at 236) the SIP 200 OK message to the MSC/VLR 114, instead of the MGCF. As a result, the ISUP ANM message (238) of FIG. 4 can be omitted.

The remaining parts of the flow of FIG. 5 are similar to the flow of FIG. 4.

Figure 6:
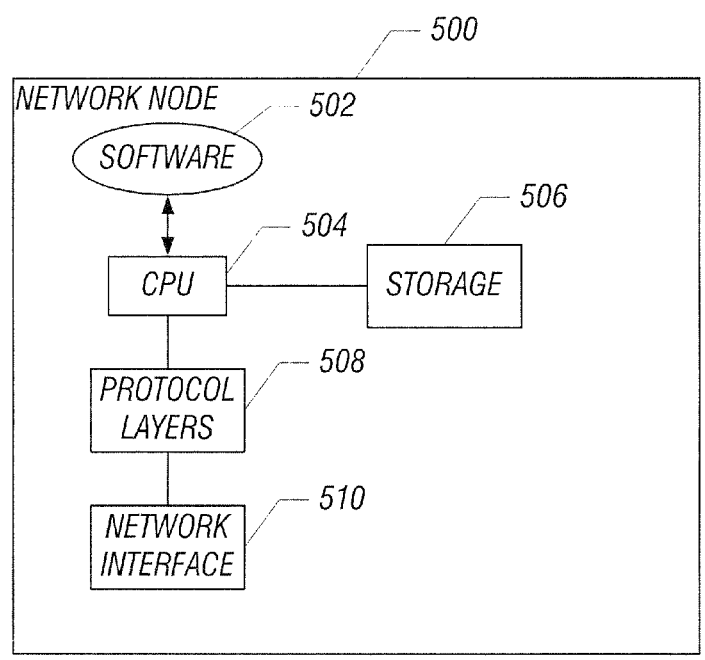
FIG. 6 is a block diagram of an exemplary network node that can be configured according to preferred embodiments of the invention.

FIG. 6 generically shows a network node 500 that can represent any one of a base station (e.g., base station in the packet-data wireless access network 108 or in the circuit wireless access network 107 of FIG. 1), the MSC/VLR 114, and the VCC AS 124, as configured according to preferred embodiments. The network node 500 includes software 502 that is executable on one or more central processing units (CPUs 504), which is (are) connected to a computer-readable storage 506 (e.g., memory, disk drive, etc.). The network node 500 also include protocol layers 508 and a network interface 510 to enable communication with another network node (e.g., between a mobile device 104 and base station, between a base station and the MSC/VLR 114, between the VCC AS 124 and the other endpoint 110 or MGCF 130, and so forth).

A CPU 504 can include any type of processor, such as microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of operating a voice call continuity (VCC) application server (AS) to reduce communication silence when handing off a mobile device between different types of wireless access networks, the method comprising:
   receiving a session initiation protocol (SIP) message addressed to the VCC AS, the message containing routing information indicating that the message is to initiate intertechnology handoff of a mobile device;
   responding to the received SIP message by sending a first message to an endpoint with which the mobile device is engaged in a call session, the first message indicating that a new bearer path is to be established; and
   sending a second message to a mobile switching center (MSC) indicating progress of a call, wherein said sending the first and second messages is timed such that the first and second messages will be received within a predetermined time interval by the endpoint and by the MSC respectively.

2. The method of claim 1, wherein the SIP message is a SIP INVITE message.

3. The method of claim 1, wherein the first message is a SIP re-INVITE message.

4. The method of claim 1, wherein the second message is a SIP 183 message.

5. A method of operating a node of a wireless communication system to reduce communication silence when handing off a mobile device between different types of wireless access network, the method comprising:
   determining that a mobile device should be handed off from a packet data wireless access network to a circuit wireless access network; and
   in response to the determining, delaying sending a message that commands the packet-data wireless access network to send a handoff message to the mobile device to perform the handoff until after a predetermined trigger has occurred; and
   sending the message that commands the packet-data wireless access network to send a handoff message to the mobile device after the predetermined trigger has occurred, wherein the message comprises a 1x handoff direction.

6. The method of claim 5, wherein determining that a mobile device should be handed off from the packet data wireless access network to the circuit wireless access network comprises:
   receiving a request to hand off a mobile device; and
   determining that the received request is a request to hand off the mobile device from the packet data wireless access network to the circuit wireless access network.

7. The method of claim 6, wherein the received request is a 1x call origination message.

8. The method of claim 6, further comprising:
   in response to determining that the received request is a request to hand off the mobile device from the packet data wireless access network to the circuit wireless access network, creating a message for sending to a receiver, the message indicating that an inter-technology handoff from a packet-data wireless access to a circuit wireless access network has been requested.

9. The method of claim 8, further comprising:
   sending the created message to a mobile switching centre (MSC).

10. The method of claim 9, wherein the created message is a 1x CM Service Request comprising a packet data indicator.

11. The method of claim 5, wherein the message comprises a HRPD handoff direction.

12. The method of claim 5, wherein the predetermined trigger comprises one of:
   a mobile switching center (MSC) receiving an IP multimedia subsystem routing number (IMRN);
   a MSC receiving an ISDN user part (IS UP) answer message (ANM);
   a MSC sending an ISUP initial address message (IAM);
   a MSC sending a session initiation protocol (SIP) INVITE message;
   a MSC receiving an ISUP address complete message (ACM);
   a MSC receiving a SIP 200 OK message; or
   a MSC receiving a SIP 183 session progress message.

13. The method of claim 12, wherein the node comprises a high rate packet data (HRPD) access node (AN).

14. The method of claim 12, wherein the node comprises an 1xRTT base station and a interworking system (IWS).

15. A server configured to reduce communication silence when handing off a mobile device between different types of wireless access networks, comprising:
   communication circuitry, configured to perform communication with a plurality of devices; and
   processing hardware coupled to the communication circuitry, wherein the processing hardware is configured to operate with the communication circuitry to:
      receive a session initiation protocol (SIP) message addressed to the server, the message containing routing information indicating that the message is to initiate intertechnology handoff of a mobile device;

respond to the received SIP message by sending a first message to an endpoint with which the mobile device is engaged in a call session, the first message indicating that a new bearer path is to be established; and send a second message to a mobile switching center (MSC) indicating progress of a call, wherein sending the first and second messages is timed such that the first and second messages will be received within a predetermined time interval by the endpoint and by the MSC respectively.

16. The server of claim 15, wherein the SIP message is a SIP INVITE message.

17. The server of claim 15, wherein the first message is a SIP re-INVITE message.

18. The server of claim 15, wherein the second message is a SIP 183 message.

* * * * *